United States Patent
Nakano

(10) Patent No.: US 10,310,259 B2
(45) Date of Patent: Jun. 4, 2019

(54) IMAGE RENDERING APPARATUS, HEAD UP DISPLAY, AND IMAGE LUMINANCE ADJUSTING METHOD

(71) Applicant: JVC KENWOOD Corporation, Yokohama-shi, Kanagawa (JP)

(72) Inventor: Tatsuya Nakano, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 140 days.

(21) Appl. No.: 15/686,068

(22) Filed: Aug. 24, 2017

(65) Prior Publication Data
US 2017/0351091 A1    Dec. 7, 2017

Related U.S. Application Data

(63) Continuation of application No. PCT/JP2015/006396, filed on Dec. 22, 2015.

(30) Foreign Application Priority Data

Feb. 24, 2015   (JP) ................................ 2015-033712

(51) Int. Cl.
　　*G02B 27/01*　　(2006.01)
　　*G09G 3/02*　　(2006.01)
　　*H04N 5/74*　　(2006.01)

(52) U.S. Cl.
　　CPC ......... *G02B 27/0101* (2013.01); *G02B 27/01* (2013.01); *G02B 27/017* (2013.01);
(Continued)

(58) Field of Classification Search
　　CPC ...... G02B 2027/0114; G02B 2027/014; G02B 2027/0159; G02B 27/01; G02B 27/0101;
(Continued)

(56) References Cited

U.S. PATENT DOCUMENTS

2009/0315925 A1    12/2009  Tanaka
2012/0001961 A1*   1/2012   Nishikawa ........... G02B 26/105
                                                345/690
2015/0294609 A1    10/2015  Ohyama et al.

FOREIGN PATENT DOCUMENTS

EP        2983158 A1      2/2016
JP        2014-132286     7/2014
(Continued)

*Primary Examiner* — Hong Zhou
(74) *Attorney, Agent, or Firm* — Procopio, Cory, Hargreaves & Savitch LLP

(57) ABSTRACT

An image rendering apparatus includes a light source unit, an optical scanner, a scanner control unit configured to control a frequency for the optical scanner to scan the laser light in the main scanning direction, and a light source driving unit. The scanner control unit multiplies the frequency by n and the light source driving unit changes time intervals at which pixels are rendered on scanning lines in the main scanning direction to 1/nth and controls the light source unit in such a way that the light source unit renders a plurality of pixels corresponding to one scanning line at least once during n scans in the main scanning direction and in such a way that the light source unit will not render pixels on scanning line(s) other than the scanning lines on which the pixels have been rendered.

6 Claims, 7 Drawing Sheets

(52) U.S. Cl.
CPC ........... *G02B 27/0149* (2013.01); *G09G 3/02* (2013.01); *H04N 5/74* (2013.01); *G02B 2027/014* (2013.01); *G02B 2027/0114* (2013.01); *G02B 2027/0159* (2013.01)

(58) Field of Classification Search
CPC .... G02B 27/0149; G02B 27/017; G09G 3/02; H04N 5/74
See application file for complete search history.

(56) References Cited

FOREIGN PATENT DOCUMENTS

| | | |
|---|---|---|
| WO | 2014/106920 A1 | 7/2014 |
| WO | 2014/162503 A1 | 10/2014 |

\* cited by examiner

IMAGE RENDERING APPARATUS, HEAD UP DISPLAY, AND IMAGE LUMINANCE ADJUSTING METHOD

CROSS REFERENCE TO RELATED APPLICATION

The present application is a continuation application of PCT Application No. PCT/JP2015/006396, filed Dec. 22, 2015, which claims the benefit of priority from Japanese Patent Application No. 2015-033712, filed on Feb. 24, 2015, the entire contents of which are hereby incorporated by reference.

BACKGROUND

The present invention relates to an image rendering apparatus, a head up display, and an image luminance adjusting method and to, in particular, a laser scanning image rendering apparatus and a head up display and an image luminance adjusting method that use the laser scanning image rendering apparatus.

Image display apparatuses that use optical scanners including scanning mirrors and raster scan laser beams to thereby display images on projection surfaces are well known (e.g., Japanese Unexamined Patent Application Publication No. 2014-132286). That is, the laser scanning image display apparatus reciprocally rocks the scanning mirror in a vertical direction according to the number of scanning lines that constitute an image at the same time as it reciprocally rocks the scanning mirror to the right and left in order to render scanning lines in a horizontal direction.

The laser scanning image rendering apparatus can be applied to, for example, an on-vehicle head up display. Video is rendered on the on-vehicle head up display through a windshield or a combiner that is present in front of a driver. Then, beams emitted from a laser light source and external light transmitted through the windshield are overlaid (overlapped) and the overlaid beams and light reach the eyes of the driver. In this way, the driver can see scenery in front of the driver together with video information.

If the laser scanning image rendering apparatus is used for the on-vehicle head up display, when surroundings are bright during the daytime, images with high contrast can be rendered because a luminance of laser beams can be made high. On the other hand, when the surroundings are dark during the nighttime, it is desired to render images with a low luminance in order to improve the visibility of the images for the driver.

SUMMARY

When a plurality of laser light sources are used as light sources of the laser scanning image rendering apparatus, if the amount of light of laser beams is reduced by reducing current to be passed through the laser light sources, there has been a problem that there will be great variations in outputs of the laser light sources due to the presence of kink regions and the like.

The image display apparatus disclosed in Japanese Unexamined Patent Application Publication No. 2014-132286 emits laser light sources in one of the forward and backward scans in a main scanning direction and displays pixels on every other scanning lines in a sub scanning direction in order to reduce a luminance of a display image to substantially half of an original luminance. However, as the image display apparatus disclosed in Japanese Unexamined Patent Application Publication No. 2014-132286 thins the number of scanning lines, there has been a problem in that a resolution of the display image in the sub scanning direction is reduced.

An exemplary aspect is an image rendering apparatus includes:
a light source unit configured to emit laser light;
an optical scanner configured to scan the laser light in such a way that the laser light reciprocates in a main scanning direction and a sub scanning direction;
a scanner control unit configured to control a frequency for the optical scanner to scan the laser light in the main scanning direction; and
a light source driving unit configured to drive the light source unit based on image data.

The scanner control unit multiplies the frequency by n, the n being a natural number of two or greater, and
the light source driving unit changes time intervals at which pixels are rendered on scanning lines in the main scanning direction to 1/nth and controls the light source unit in such a way that the light source unit renders a plurality of pixels corresponding to one scanning line at least once during n scans in the main scanning direction and in such a way that the light source unit will not render pixels on scanning line(s) other than the scanning lines on which the pixels have been rendered to thereby reduce a luminance of a rendered image.

Another exemplary aspect is a head up display configured to use the above image rendering apparatus and to reflect an image rendered by the image rendering apparatus on a transparent member in order to present the rendered image to a user.

Another exemplary aspect is an image luminance adjusting method using an image rendering apparatus including:
a light source unit configured to emit laser light;
an optical scanner configured to scan the laser light in such a way that the laser light reciprocates in a main scanning direction and a sub scanning direction;
a scanner control unit configured to control a frequency for the optical scanner to scan the laser light in the main scanning direction; and
a light source driving unit configured to drive the light source unit based on image data. The image luminance adjusting method includes:
multiplying the frequency by n, the n being an natural number of two or greater,
changing time intervals at which pixels are rendered on scanning lines in the main scanning direction to 1/nth;
rendering a plurality of pixels corresponding to one scanning line at least once during n scans in the main scanning direction and preventing from rendering pixels on scanning lines other than the scanning line(s) on which the pixels have been rendered to thereby reduce a luminance of a rendered image.

DETAILED DESCRIPTION

First Exemplary Embodiment

Hereinafter, an exemplary embodiment of the present invention will be described with reference to the drawings.

Figure 1:
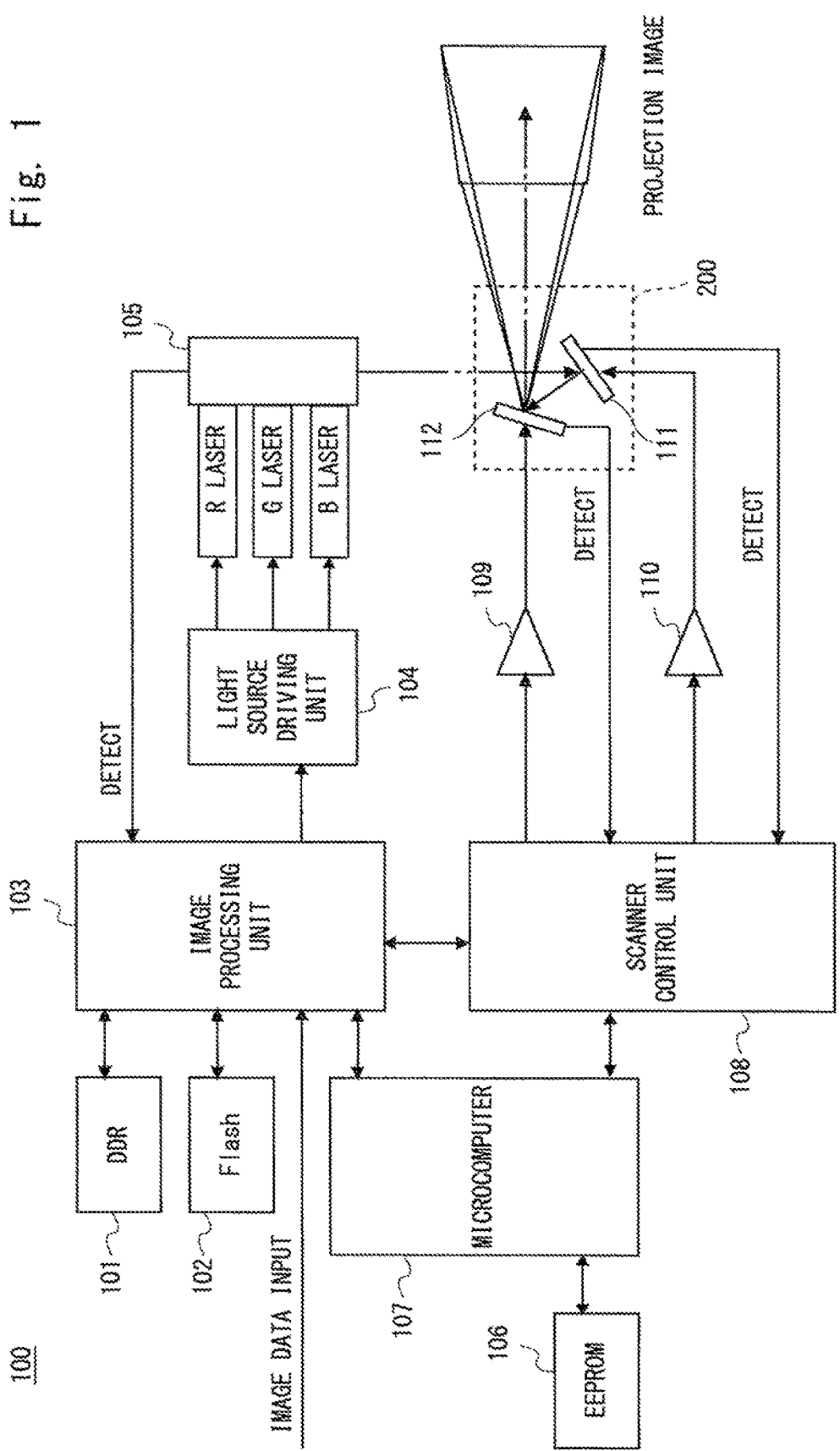
FIG. 1 is a block diagram showing a configuration of an image rendering apparatus according to a first exemplary embodiment.
Figure 2:
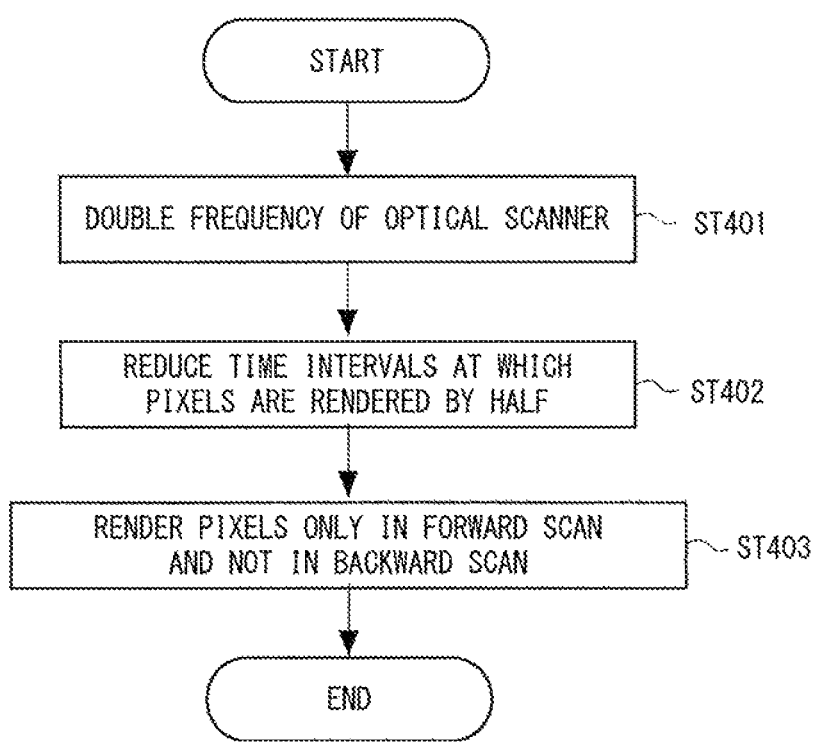
FIG. 2 is a flowchart showing an image luminance adjusting method using the image rendering apparatus according to the first exemplary embodiment.

FIG. 1 is a block diagram showing a configuration of an image rendering apparatus 100 according to this exemplary embodiment. The image rendering apparatus 100 includes a DDR (Double Data Rate) memory 101, a flash memory 102, an image processing unit 103, a light source driving unit 104, a light source unit 105, an EEPROM (Electrically Erasable and Programmable Read Only Memory) 106, a microcomputer 107, a scanner control unit 108, a vertical scanner driver 109, a horizontal scanner driver 110, and an optical scanner 200. Note that a vertical direction of an image to be rendered may also be referred to as V (Vertical) axis direction, and a horizontal direction of the image to be rendered may also be referred to as H (Horizontal) axis direction.

The DDR memory 101 is a frame buffer that temporarily stores image data input to the image processing unit 103. The DDR memory 101 may be a DDR2, a DDR3, or other SDRAMs. The flash memory 102 is a non-volatile storage unit that stores data and programs necessary for the image processing unit 103 to operate.

The image processing unit 103 performs processing such as data sorting and the like on the image data input from the DDR memory 101 and outputs the image data to the light source driving unit 104 and the scanner control unit 108. The image processing unit 103 may be achieved by hardware such as an FPGA (Field Programmable Gate Array) or the like or may be achieved by a program stored in the flash memory 102 and a CPU (Central Processing Unit).

The light source driving unit 104 drives the light source unit 105 based on the image data supplied by the image processing unit 103. The light source driving unit 104 drives the light source unit 105 based on the input image data at timings determined by the image processing unit 103. The light source driving unit 104 drives the light source unit 105 to render a plurality of pixels according to dot clocks having a frequency corresponding to the number of pixels of scanning lines in a main scanning direction.

The light source unit 105 outputs laser beams in three colors, i.e., red (R), green (G), and blue (B), when it is driven by the light source driving unit 104. The light source unit 105 has, for example, three laser light sources, namely, a red laser light source, a green laser light source, and a blue laser light source. Light emitted from the three laser light sources is synchronized into one light beam by a dichroic mirror or the like and then emitted. The laser beams emitted by the light source unit 105 create various colors and forms used for projection images when the image processing unit 103 controls emission intensity and emission time of the respective colors of RGB, which are driven by the light source driving unit 104.

The microcomputer 107 generates driving signals for the scanner control unit 108 to operate and outputs the generated driving signals to the scanner control unit 108. The EEPROM 106 is a non-volatile storage unit that stores data and programs necessary for the scanner control unit 108 to operate.

The scanner control unit 108 controls swing angles of mirrors, a frequency of scanning, and the like of the optical scanner 200. The scanner control unit 108 generates a waveform of a driving voltage in such a way that the optical scanner 200 can obtain a desired swing angle, a desired frequency, and the like. The scanner control unit 108 controls the optical scanner 200 to scan laser beams in the main scanning direction according to a line counter having a certain frequency.

The scanner control unit 108 may be realized by hardware such as a FPGA or the like or may be realized by a program stored in the flash memory 102 and a CPU. The scanner control unit 108 performs feedback control on the optical scanner 200 based on a current detection value such as the swing angle of the mirror, the frequency of the scanning, and the like.

The optical scanner 200 scans laser beams by reflecting the laser light beams on the mirrors at angles according to the driving voltage. The optical scanner 200 is, for example, MEMS mirrors and scans the laser beams by tilting the mirrors at the angles according to the driving voltage and then reflecting the laser beams to thereby scan the laser beams. The optical scanner 200 scans the laser beams in such a way that the laser beams reciprocate in the respective directions of the main scanning direction and the sub scanning direction. The optical scanner 200 includes a horizontal scanner 111 and a vertical scanner 112. The vertical scanner 112 scans the laser beams in the vertical direction, while the horizontal scanner 111 scans the laser beams in the horizontal direction.

The vertical scanner driver 109 rocks the mirror of the vertical scanner 112 according to a vertical driving signal supplied by the scanner control unit 108. The horizontal scanner driver 110 rocks the mirror of the horizontal scanner 111 according to a horizontal driving signal supplied by the scanner control unit 108.

The vertical scanner 112 is an optical scanner that reflects the laser light emitted by the light source unit 105 on its mirror and rocks the mirror based on the signal from the vertical scanner driver 109 in order to scan the laser beams in the vertical direction. The horizontal scanner 111 is an optical scanner that reflects the laser light emitted by the light source unit 105 on its mirror and rocks the mirror based on the signal from the horizontal scanner driver 110 in order to scan the laser beams in the horizontal direction.

In this example, the horizontal scanner 111 reflects the laser light from the light source unit 105, and then the vertical scanner 112 reflects the reflected light from the horizontal scanner 111 in order to render a projection image on a projection surface. The vertical scanner 112 and the horizontal scanner 111 are considered to constitute the optical scanner 200 that reciprocally scans the laser beams in the vertical and the horizontal directions. For example, the vertical scanner 112 and the horizontal scanner 111 may be a two-axis (two-dimensional) optical scanner. Various types of scanners such as a piezoelectric scanner, a coil driven scanner, or the like may be used for the vertical scanner 112 and the horizontal scanner 111.

An image luminance adjusting method using the image rendering apparatus 100 will be described with reference to FIGS. 2 to 6. It will be described with reference to a flowchart of FIG. 2 below.

Figure 3:
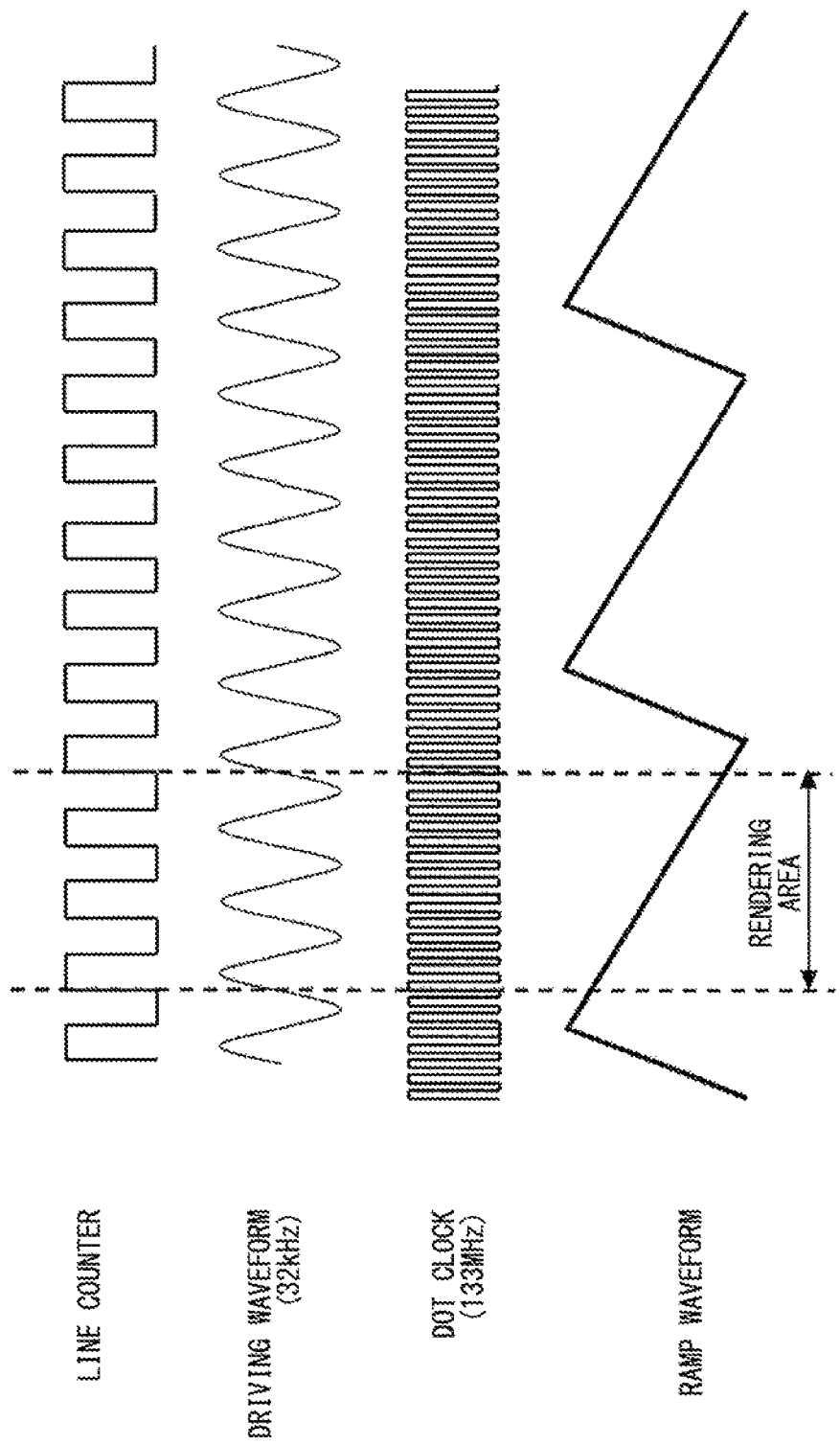
FIG. 3 is a diagram showing waveforms for driving an optical scanner and a light source unit according to the first exemplary embodiment.

Firstly, a state before image luminance adjustment is performed will be described. As shown in FIG. 3, the scanner control unit 108 drives the horizontal scanner 111 according to a driving waveform at 32 kHz that is in accordance with the line counter at 32 kHz to thereby control the optical scanner 200 to scan the laser beams in the horizontal direction. The scanning by the vertical scanner 112 is performed according to a ramp waveform.

Figure 4:
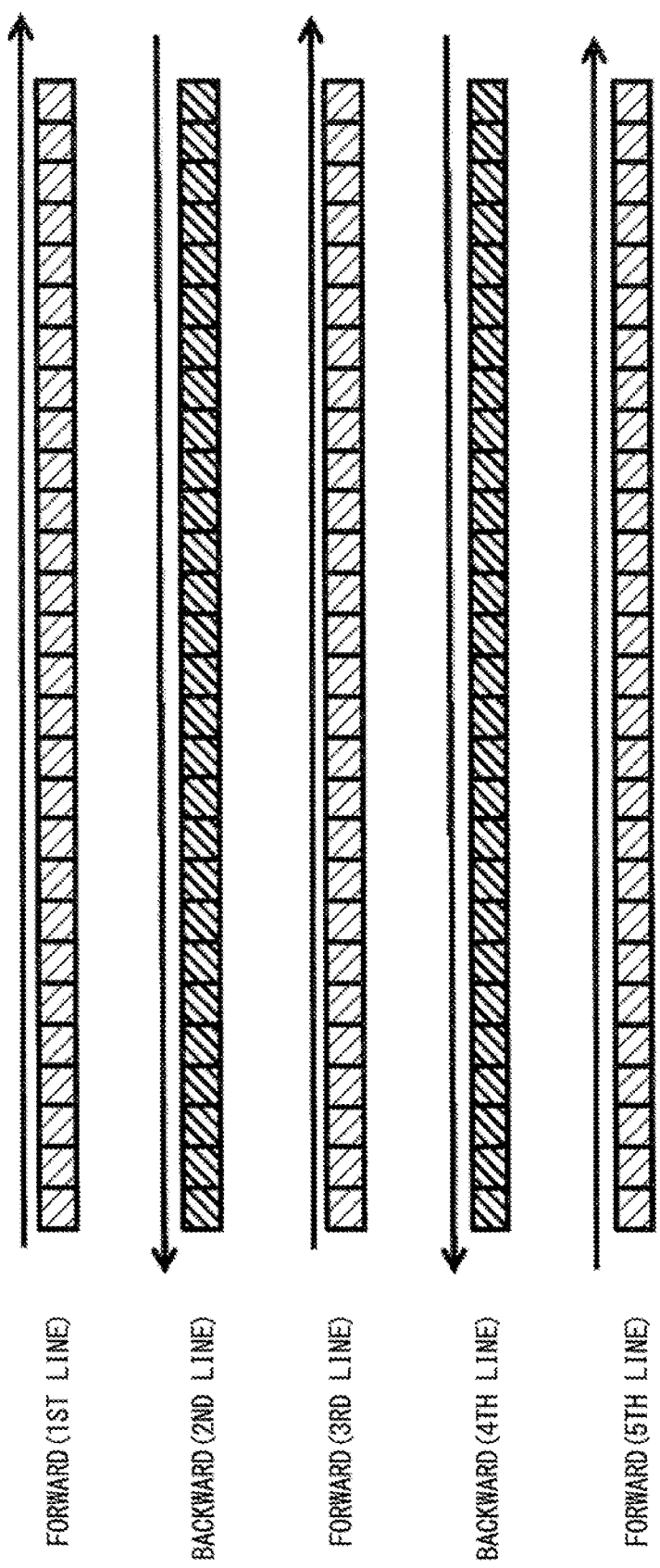
FIG. 4 is a drawing for explaining an image rendered by the image rendering apparatus according to the first exemplary embodiment.

At this time, the light source driving unit 104 blinks the light source unit 105 according to a dot clock at 133 MHz in order to render pixels on the scanning lines, as shown in FIG. 4. The horizontal scanner 111 scans the laser beams in a forward scan to render pixels on one scanning line and scans the laser beams in a backward scan to render pixels on the next scanning line. The horizontal scanner 111 continues to scan the laser beams from an upper end to a lower end of the image in the horizontal direction to thereby scan the laser beams and render the image. The luminance of the rendered image is reduced in this state.

Figure 5:
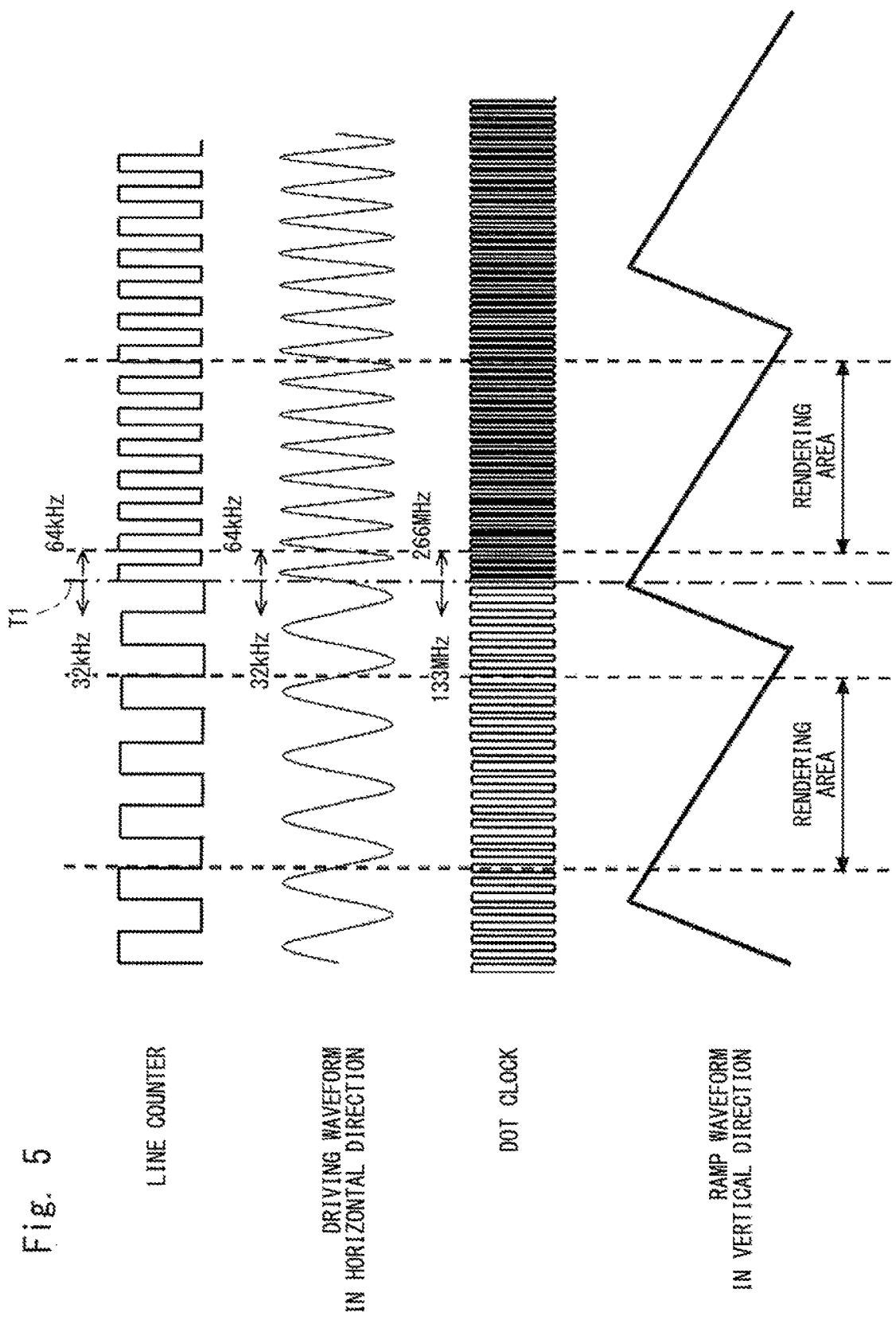
FIG. 5 is a drawing showing waveforms for driving the optical scanner and the light source unit when a luminance of the rendered image is reduced by the image rendering apparatus according to the first exemplary embodiment.

Firstly, as shown in FIG. 5, at the timing T1, the scanner control unit 108 doubles the frequency of the line counter to 64 kHz to thereby double the frequency of the horizontal scanner 111 to 64 kHz (ST401). When the frequency of the horizontal scanner 111 is doubled, a scanning speed of the laser beams in the main scanning direction is doubled. Therefore, the number of scanning lines is double the number of the scanning lines before the frequency of the horizontal scanner 111 is changed.

Next, at the timing T1, the light source driving unit 104 doubles the frequency of the dot clock to 266 MHz to thereby reduce time intervals at which pixels are rendered on the scanning lines in the main scanning direction to half (ST402). When the time intervals at which the pixels are rendered are reduced by half as the scanning speed in the main scanning direction is doubled, the number of pixels in the main scanning direction can be maintained to be the same as that before the frequency of the horizontal scanner 111 is changed.

Figure 6:
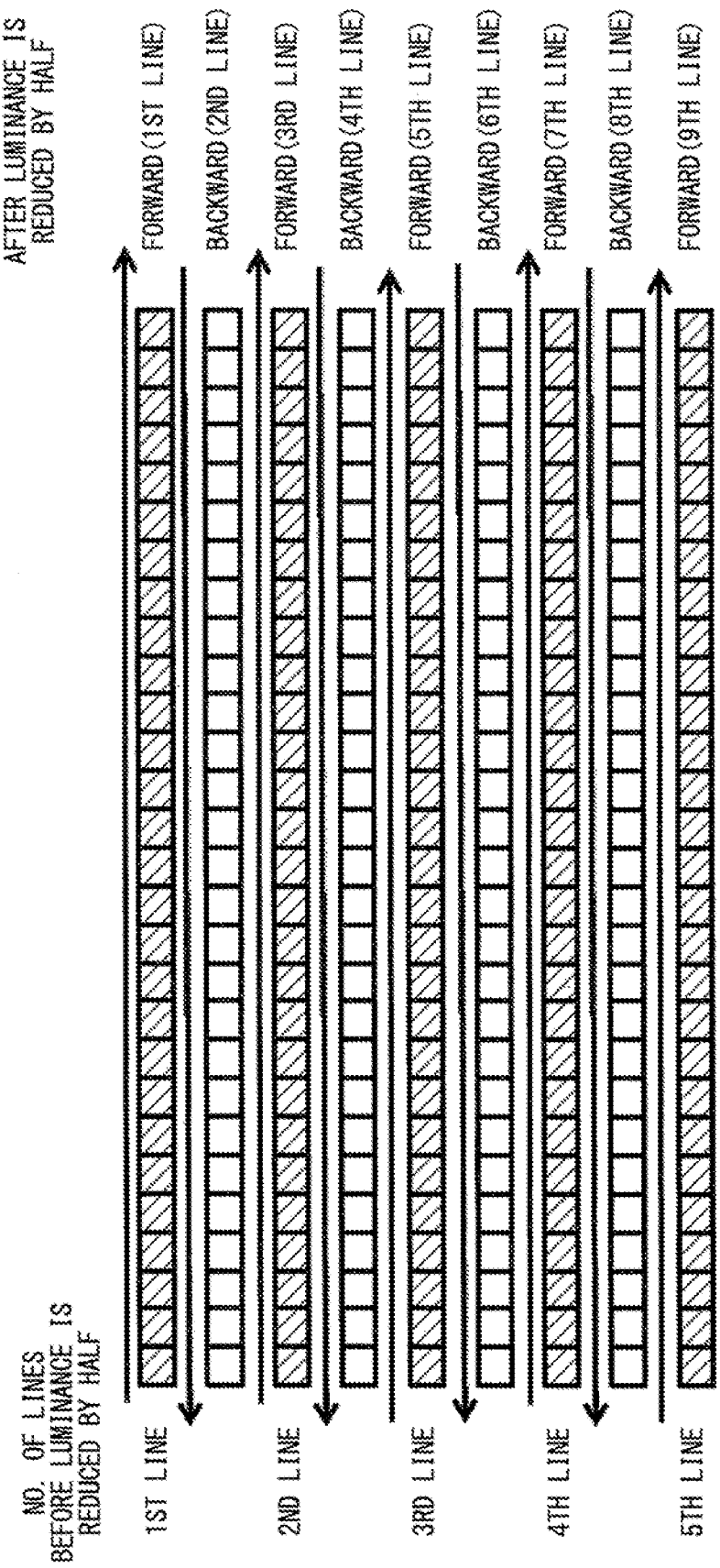
FIG. 6 is a drawing for explaining the rendered image with its luminance reduced by the image rendering apparatus according to the first exemplary embodiment.

Next, as shown in FIG. 6, the light source driving unit 104 drives the light source unit 105 to scan a plurality of pixels corresponding to the scanning line in the forward scan and also controls the light source unit 105 in such a way that the light source unit 105 will not render pixels on the scanning line in the backward scan, while the light source unit 105 performs scanning in the main scanning direction twice in the forward and backward scans in the main scanning direction (ST403).

When the image rendering apparatus 100 doubles the scanning speed in the main scanning direction, the luminance of the rendered image can be reduced by half. Further, as the image rendering apparatus 100 doubles the number of scanning lines and then renders pixels on half of the scanning lines, the resolution of the rendered image in the sub scanning direction stays the same as it is before the luminance is reduced.

The light source driving unit 104 may control the light source unit 105 so that the light source unit 105 will not render pixels rendered in one of the forward and backward scans of the optical scanner 200, which pixels will be on the scanning line in the main scanning direction, and the scanning line on which the pixels are not rendered is not limited to the backward scan.

The light source driving unit 104 may multiply the frequency of the horizontal scanner 111 by n, where n is a natural number of two or greater. When the frequency of the horizontal scanner 111 is multiplied by n, it is preferable to multiply the time intervals at which the pixels are rendered on the scanning lines in the main scanning direction by 1/n.

When the frequency of the horizontal scanner 111 is multiplied by n, the light source driving unit 104 controls the light source unit 105 to render a plurality pixels corresponding to one scanning line at least once during n scans. Further, the light source driving unit 104 preferably control the light source unit 105 in such a way that the light source unit 105 will not render pixels on other scanning lines than the scanning lines on which the pixels have been rendered. Thus, the luminance of the rendered image can be reduced to 1/n.

When the light source driving unit 104 controls the light source unit 105 to render a plurality of pixels corresponding to one scanning line, the light source driving unit 104 may control the light source unit 105 in such a way that the light source unit 105 will not render pixels in an n−1th scan following the scanning corresponding to the one scanning line.

When the image rendering apparatus 100 multiplies the scanning speed in the main scanning direction by n, the luminance of the rendered image can be reduced to 1/n. Moreover, as the image rendering apparatus 100 multiplies the number of scanning lines by n and then render pixels on one line in n scanning lines, the resolution of the rendered image in the sub scanning direction stays the same as it is before the luminance is reduced.

As described above, according to the image rendering apparatus 100 of this exemplary embodiment, it is possible to provide an image rendering apparatus that can reduce a luminance of a rendered image while maintaining a resolution of the rendered image.

When a luminance of an image is reduced by disposing an ND filter on an optical path of laser beams, there will be an increase in the number of components included in the configuration, which could cause a failure due to vibrations or the like if the device is mounted on a vehicle. On the other hand, as a mechanical mechanism of the image rendering apparatus 100 according to this exemplary embodiment is not one in which an ND filter is inserted in and removed from an optical path, the image rendering apparatus 100 is less susceptible to failures due to vibrations or the like and has improved reliability.

Moreover, when the luminance of the image is reduced by reducing outputs of laser light sources of the light source unit 105, there may be variations in amounts of output light of RGB due to the presence of kink regions. On the other hand, as the image rendering apparatus 100 according to this exemplary embodiment can reduce the luminance of the image without reducing outputs of the laser light sources of the light source unit 105, there will be less variations in the amounts of output light of RGB.

Figure 7:
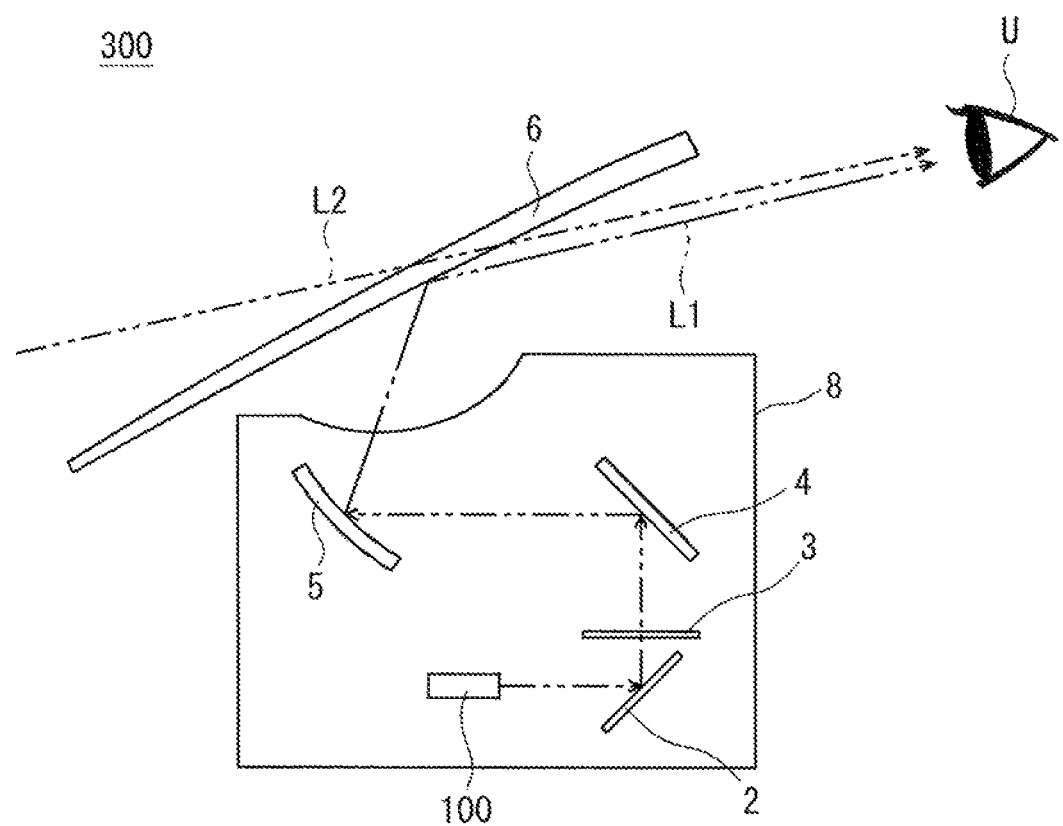
FIG. 7 is a drawing showing a configuration of a head up display according to the first exemplary embodiment.

A head up display 300 using the image rendering apparatus 100 according to this exemplary embodiment will be described below. Firstly, a configuration of the head up display 300 will be described with reference to FIG. 7. As shown in FIG. 7, the head up display 300 includes an image rendering apparatus 100, a first planar mirror 2, a screen 3, a second planar mirror 4, a recessed mirror 5, a projecting unit 6, and an enclosure 8.

An optical path for a light beam L1 emitted by the image rendering apparatus 100 to reach the eyes of a user U will be described with reference to FIG. 7. The light beam L1 emitted from the image rendering apparatus 100 is reflected by the first planar mirror 2, the optical path of the light beam L1 is bent, and then the light beam L1 enters the screen 3. The light beam L1 forms an intermediate image of the rendered image on the screen 3. The screen 3 is a light transmissive screen. For example, a diffuser or a microlens array is used for the screen 3. The microlens array includes microlenses arranged in a matrix. The microlens has an effect of reducing speckles of laser beams and is designed to optimize an emission angle and color non-uniformity.

The light beam L1 emitted from the screen 3 is reflected by the second planar mirror 4, the optical path of the light beam L1 is bent, and then the light beam L1 enters the recessed mirror 5. The light beam L1 reflected by the recessed mirror 5 is emitted outside the enclosure 8 and enters the projecting unit 6. The projecting unit 6 reflects a portion of the incident light beam and transmits a remaining portion of the incident light beam. The projecting unit 6 is a transparent member that presents images to a user. A combiner or a windshield of an automobile may be used for the projecting unit 6.

In the head up display 300, the light beam L1 emitted from an opening of the enclosure 8 and reflected by the projecting unit 6 and a light beam L2 passed through the projecting unit 6 are made to overlap by the projecting unit 6 and directed to the user U. From the user U's view, the user U can see an image rendered on the image rendering apparatus 100, which is a virtual image, through scenery on the projecting unit 6.

Note that the present invention is not limited to the above exemplary embodiments, and various modifications can be made without departing from the scope of the invention. For example, the optical scanner 200 is not limited to a scanning mirror such as an MEMS mirror, a Galvano mirror, or the like and may instead be an optical scanner using the electro-optic effect.

Moreover, the image rendering apparatus 100 may not only be used for an on-vehicle head up display. That is, it may also be used for a head-mounted display such as a helmet-mounted display, a spectacle type display, and the like. That is, the present invention is not applied only to the device mounted on a four-wheel automobile. For example, the present invention may be applied to a helmet-mounted image rendering apparatus, and a driver of a motorcycle may wear the helmet.

What is claimed is:

1. An image rendering apparatus comprising:
a light source unit configured to emit laser light;
an optical scanner configured to scan the laser light in such a way that the laser light reciprocates in a main scanning direction and a sub scanning direction;
a scanner control unit configured to control a frequency for the optical scanner to scan the laser light in the main scanning direction; and
a light source driving unit configured to drive the light source unit based on image data, wherein
the scanner control unit multiplies the frequency by n, the n being a natural number of two or greater, and
the light source driving unit changes time intervals at which pixels are rendered on scanning lines in the main scanning direction to 1/nth and controls the light source unit in such a way that the light source unit renders a plurality of pixels corresponding to one scanning line at least once during n scans in the main scanning direction and in such a way that the light source unit will not render pixels on scanning line(s) other than the scanning lines on which the pixels have been rendered to thereby reduce a luminance of a rendered image.

2. The image rendering apparatus according to claim 1, wherein when the light source driving unit drives the light source unit to render the plurality of pixels corresponding to the one scanning line, the light source driving unit controls the light source unit in such a way that the light source unit will not render pixels in an n−1th scan following the scan corresponding to the one scanning line.

3. The image rendering apparatus according to claim 1, wherein when the natural number n is two, the light source driving unit controls the light source unit in such a way that the light source unit will not render pixels corresponding to one of a forward scan and a backward scan by the optical scanner on the scanning line in the main scanning direction.

4. The image rendering apparatus according to claim 1, wherein
the scanner control unit controls the optical scanner to scan laser light in the main scanning direction according to a line counter including a certain frequency,
the light source driving unit drives the light source unit to render the plurality of pixels according to a dot clock including a frequency corresponding to the number of pixels on the scanning lines,
the scanner control unit increases the frequency of the line counter and the light source driving unit increases the frequency of the dot clock according to the frequency of the line counter to thereby reduce the luminance of the rendered image.

5. A head up display configured to use the image rendering apparatus according to claim 1 and to reflect an image rendered by the image rendering apparatus on a transparent member in order to present the rendered image to a user.

6. An image luminance adjusting method using an image rendering apparatus comprising:
a light source unit configured to emit laser light;
an optical scanner configured to scan the laser light in such a way that the laser light reciprocates in a main scanning direction and a sub scanning direction;
a scanner control unit configured to control a frequency for the optical scanner to scan the laser light in the main scanning direction; and
a light source driving unit configured to drive the light source unit based on image data, the image luminance adjusting method comprising:
multiplying the frequency by n, the n being a natural number of two or greater,
changing time intervals at which pixels are rendered on scanning lines in the main scanning direction to 1/nth;
rendering a plurality of pixels corresponding to one scanning line at least once during n scans in the main scanning direction and preventing rendering of pixels on scanning lines other than the scanning line(s) on which the pixels have been rendered to thereby reduce a luminance of a rendered image.

* * * * *